(12) United States Patent
Buisman et al.

(10) Patent No.: US 7,080,737 B2
(45) Date of Patent: Jul. 25, 2006

(54) METHOD AND SYSTEM FOR AUTOMATICALLY SORTING AND PACKING PRODUCTS

(75) Inventors: Paul Buisman, Scherpenzeel (NL); Peter Richard Neumann, De Glind (NL)

(73) Assignee: FPS Food Processing Systems B.V., (NL)

( * ) Notice: Subject to any disclaimer, the term of this patent is extended or adjusted under 35 U.S.C. 154(b) by 165 days.

(21) Appl. No.: 10/428,000

(22) Filed: May 2, 2003

(65) Prior Publication Data

US 2003/0226787 A1 Dec. 11, 2003

(30) Foreign Application Priority Data

May 2, 2002 (EP) .................................. 02076693

(51) Int. Cl.
*B07C 5/02* (2006.01)
(52) U.S. Cl. ........................................ 209/3.3; 209/510
(58) Field of Classification Search ................. 209/3.1, 209/3.3, 510, 512, 513, 552, 583, 592; 53/147, 53/154
See application file for complete search history.

(56) References Cited

U.S. PATENT DOCUMENTS

| | | | |
|---|---|---|---|
| 3,141,540 A * | 7/1964 | Burkhardt ................... | 209/566 |
| 3,379,321 A | 4/1968 | Weir | |
| 3,786,944 A * | 1/1974 | Daigle et al. ............... | 414/281 |
| 3,898,435 A | 8/1975 | Pritchard et al. | |
| 4,299,326 A | 11/1981 | Ulch | |
| 5,043,908 A * | 8/1991 | Manduley et al. .......... | 700/227 |
| 6,520,342 B1 * | 2/2003 | Dumke et al. .............. | 209/539 |

(Continued)

FOREIGN PATENT DOCUMENTS

DE    201 20 664 U    3/2002

(Continued)

OTHER PUBLICATIONS

Patent Abstracts of Japan, vol. 015, No. 041 (P-1160), Jan. 31, 1991 & JP 02 276922 (Ishida Scales MFG Co Ltd), Nov. 13, 1990, *abstract*.

(Continued)

*Primary Examiner*—Joseph Rodriguez
(74) *Attorney, Agent, or Firm*—Stites & Harbison PLLC; Marvin Petry

(57) ABSTRACT

A method is provided for automatically sorting and packing batches of products, such as, for instance, eggs or fruits which are each provided with an origin code. The method includes supplying first batches of coded products to a sorting apparatus and simultaneously assigning the corresponding codes to fields of a register of a computer program. The products are subjected to criteria in at least one classification apparatus and the products are marked with classification data as obtained with the classification apparatus, while for each individual product the codes and the data are assembled with the computer program in fields of the register to form a label. The classified products are sorted and subsequently packaged to form second, sorted batches of products at packing stations of a packing apparatus. The products at the packing stations are batchwise provided with a second code, a destination code, and these second codes are assigned to the fields of the register and therein are added to the labels of each corresponding product. A computer program comprises a routine for, upon discharge of the second batches from the packing stations, collecting labels that contain at least a same destination code and a same origin code of such second batches. A system is provided for practicing this method.

11 Claims, 2 Drawing Sheets

U.S. PATENT DOCUMENTS

Figure 1:
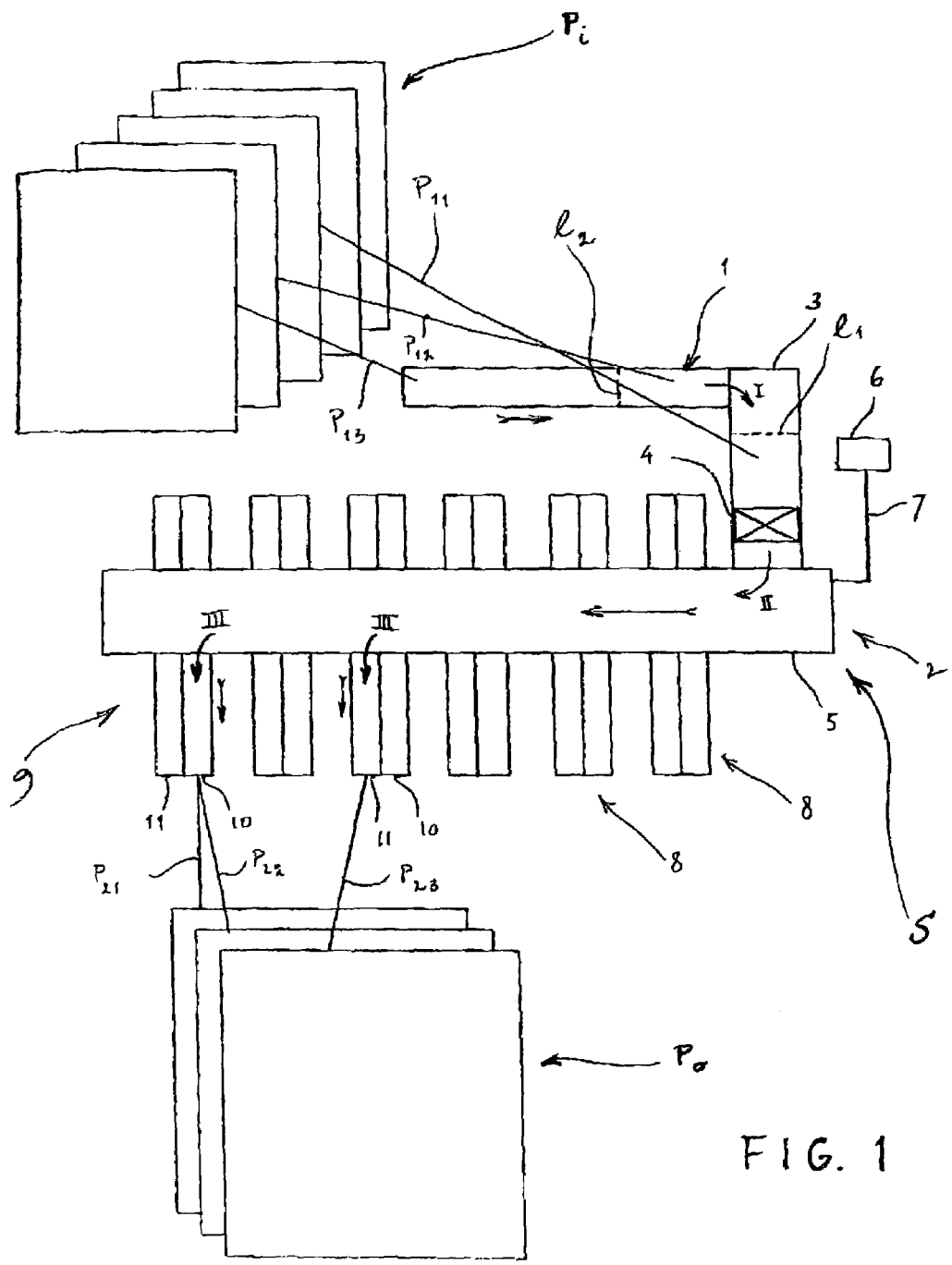

| | | |
|---|---|---|
| 6,522,945 B1 * | 2/2003 | Sleep et al. .................. 700/225 |
| 2002/0011311 A1 | 1/2002 | Carignan et al. |
| 2002/0026768 A1 * | 3/2002 | Duncan et al. ................. 53/52 |
| 2004/0220855 A1 * | 11/2004 | Carignan et al. ............. 705/14 |

FOREIGN PATENT DOCUMENTS

| EP | 0 945 350 | 12/2002 | | |
|---|---|---|---|---|
| GB | 1394348 | * | 5/1975 | |

OTHER PUBLICATIONS

Anonymous: "Hand held probe" Research Disclosure, Kenneth Mason Publications, Hampshire, GB, vol. 462, No. 36, Oct. 2002, XP007131333 ISSN: 0374-4353 *page 1*.

* cited by examiner

METHOD AND SYSTEM FOR AUTOMATICALLY SORTING AND PACKING PRODUCTS

The present invention relates to a method and a system for automatically sorting and packing products.

More specifically, the invention relates to such a method comprising:

- feeding first batches of coded products to a sorting apparatus and simultaneously assigning the corresponding codes to fields of a register of a computer program,
- subjecting the products to criteria in at least one classification apparatus,
- marking the products with classification data as obtained with the classification apparatus, while for each individual product the codes and the data are assembled with the computer program in fields of the register to form a label, and
- sorting and subsequently packing the classified products to form second, sorted batches of products at packing stations of a packing apparatus.

Such a system comprises:

- a loading apparatus for placing first batches of coded products on a sorting apparatus,
- the above-mentioned sorting apparatus for, in accordance with a sorting criterion, sorting the products, while the products are fed with a conveyor to packing stations of a packing apparatus,
- a computer for controlling the sorting apparatus and the packing apparatus, the computer comprising inter alia
  - a central processing unit for executing a computer program for executing the sorting criterion, the program including in particular a register with fields for storing, moving, going through, and erasing data that are presented to the program, and
  - a data input element for assigning product data of each product to corresponding fields of the register, while during the intake of the products by the loading apparatus, these data are assembled to form a label for each product, as well as an erasing element for erasing the labels after discharge of the products from the packing apparatus,
- at least one classification apparatus, for instance a weighing apparatus, for classifying the products according to well-defined criteria, while the obtained classification data are added to the labels in the register, and
- the above-mentioned packing stations, on which the products are packaged to form second, sorted batches.

In the case of products such as eggs, on average, per hour, many tens of thousands of them are processed and packaged on a sorting machine. They are supplied in batches coming from different suppliers, for instance laying batteries in the case of eggs, in all sorts and sizes, for instance different in color and/or size, as a result of, for instance, differences in breed and age of the laying hens. These batches are generally sorted out and distributed in a packing station by sorting machines, and assembled to form new, second batches as specified and desired by buyers, which are mostly department stores. Such sorting machines comprise packing stations which mostly consist of packing conveyors on which the products can be packed in virtually any desired packing form. The number of packing conveyors can thus run up to thirty. These new, second batches comprise eggs sorted by size, possibly also by color, while selection can be based even on the presence of hair cracks or inclusions of blood. As soon as a batch is fed to the sorting machine, the origin of this batch is entered in a computer taking care both of the administration of this sorting apparatus and the control thereof. This means that in the computer program, which is executed by the computer, to each product, such as an egg here, a label is assigned in which the data needed for selection, sorting and packing are included. The assembly of second batches mostly takes place simultaneously. That is to say, the products from one and the same batch are divided over different packing conveyors allocated to current, in most cases several, sometimes even as many, different buyers.

This is different as regards the destinations, that is, the buyers of the newly formed batches. These are, at least at some packing stations, marked by recording, this time not automatically but manually, for instance in time tables, date and duration of assembly of these second batches, during sorting. In these tables, it must be recorded on which packing conveyors, during what time periods, what second batches have been formed. If necessary, these tables can be compared with the processing times from the computer and in this way make it possible, in principle, to trace for every product the data desired in a later stage. This is necessary, for instance, if it turns out later that eggs have different specifications than specified by the buyer, or if particular eggs do not meet certification standards as imposed by the authorities.

It will be clear from the above that in packing stations where a couple of millions of eggs a day are sorted, tracking and tracing, that is, respectively, accurate retrieval of destination and origin at the same time, is virtually impossible with the above-outlined method for products such as eggs. A watertight marking will be possible only when the sorting machine is stopped and the recording of batch changes takes place in a properly controlled manner. However, it is impossible to accomplish this automatically, and hence fast. Nor is it possible to execute accurate, reliable and objective control procedures which have been increasingly in demand over the past years because of the enormous increase of the production of foodstuffs.

In order to remedy this drawback, the method according to the present invention is characterized in that the products at the packing stations are batchwise provided with a second code, a destination code, and these second codes are assigned to the fields of the register and therein are added to the labels of each corresponding product, the computer program comprising a routine for, upon discharge of the second batches from the packing stations, collecting labels that contain at least a same destination code and a same origin code of such second batches.

In this way, the possibilities of a computer-controlled sorting apparatus are utilized in a highly advantageous manner, not only to obtain cross-sections with desired data very rapidly but also to map the properties of the huge amount of products with great accuracy.

Further, the system according to the invention is characterized in that the computer executes a computer program according to any one of the claims as defined for the method.

EP945350 discloses a method and apparatus for identifying and handling fruit and vegetables, in which such products, after sorting, end up on a conveyor belt and are subsequently packaged. Through machine reading of codes, regarding both the operator standing at the conveyor belt and the package in which the products are collected by the operator, and linkage of the sorting data and the read codes in a computer, it has been found possible to check the composition of these packaged batches.

Although this known method allows tracking of the direct history of the batch prior to discharge from the packing apparatus, it does not in any way provide a procedure whereby for each individual from whatever batch, origin and destination of such individual can be determined.

Figure 2:
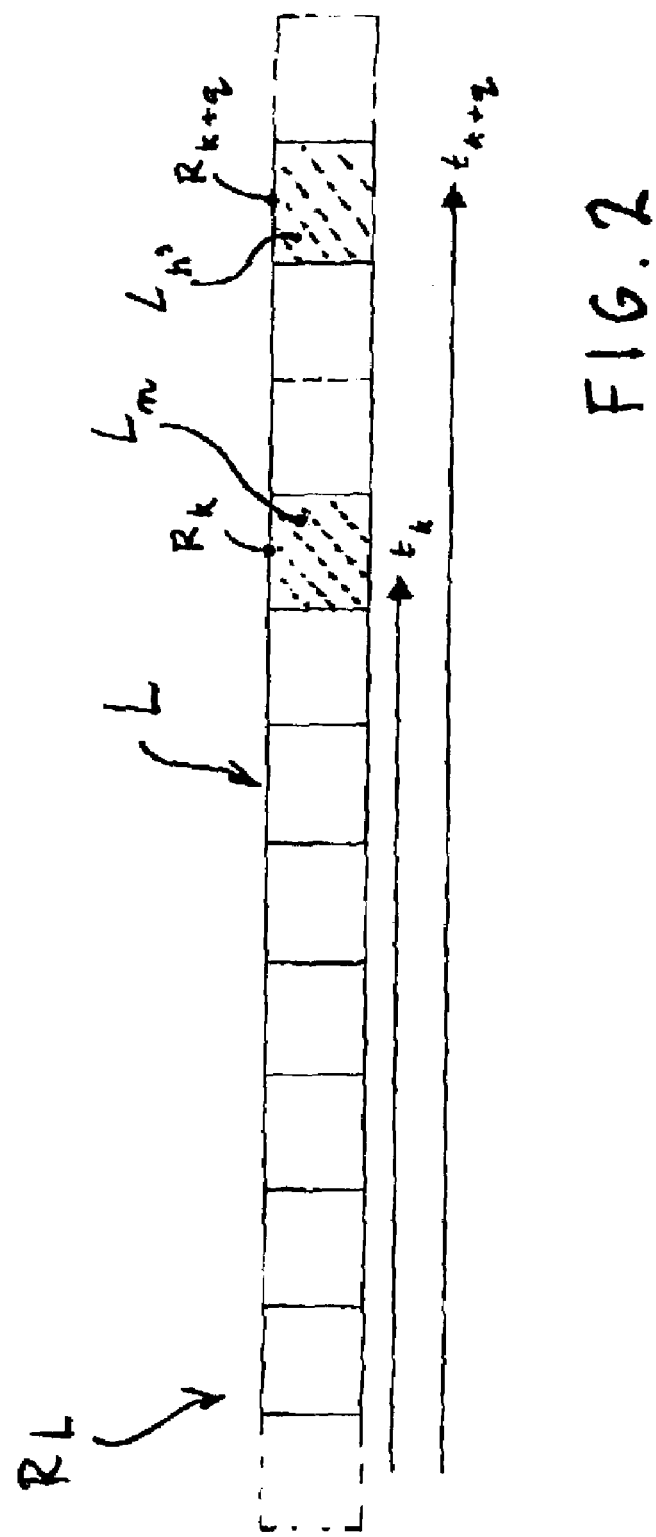

Further embodiments and details of the invention will be elucidated hereinbelow in detail with reference to a drawing, in which FIG. 1 shows a diagram of a packing station in which batches of products are successively supplied, sorted, and finally discharged in accordance with the invention, and FIG. 2 schematically shows a shift register from a computer program.

FIG. 1 schematically represents, in succession, supplied batches Pi, a sorting section S, and discharge batches $P_O$. These batches P comprise products such as, for instance, eggs or fruit, which are generally uniform and difficult to distinguish as "individuals" and which, after sorting, are to remain traceable somehow as regards their origin and destination. Hereinafter, looking for the origin will be called "tracing" and looking for the destination will be called "tracking".

These batches P are processed with sorting apparatus generally known in this field of the art. In FIG. 1, for such an apparatus, the following parts are schematically indicated: a loading apparatus 1, a sorting machine 2, and packing stations 9.

More particularly, the loading apparatus 1 comprises an element for picking up the products from feeding units. For eggs, these are often suction cup pickup units to place the eggs from, for instance, cardboard trays onto a is roller conveyor 3, where nests are formed by each successive pair of diabolo-shaped rollers mounted on shafts of an endless conveyor. Designated by I is a transition element from the loading apparatus 1 to the roller conveyor 3.

The products are subsequently passed along a classification apparatus 4. 'Classification' is here understood to mean the weighing of the products, the imaging of the products for determining surface features, or other test units, and, of course, combinations of these forms of classification. Each "individual" in this way acquires a variety of features which are compared with criteria, previously determined for the purpose, for selecting these products. The drive of this apparatus, the procuring of data and the associated signals, and in particular the ordering of these data are controlled by computer 6, in particular the setting thereof, and more particularly the inputting of a setting in a computer program, with the supply of data proceeding along signal lines 7, of which, by way of example, only a single combination of input-signal line is represented. Thus, the above-mentioned features will be assembled for each product to form a label.

After the classification, the products are transferred with a second transition element II to a conveyor 5. For products such as eggs and fruit, such a conveyor consists of an endless chain having grippers attached thereto, or cups for fruit, mostly in rows side-by-side. With release devices III, generally known, the products are released at the packing stations 9 into packing devices 8, more particularly onto so-called packing belts 10, 11. On these packing belts, packing units, such as cartons or trays, are supplied, into which the products are released. By way of example, it is indicated with arrows in what direction the discharge over the packing belts is carried out. In addition, it is possible to provide these packing belts, for instance at the end thereof, with labeling devices in order to mark these packing units with labels or also with a form of print, for instance through ink jetting.

In FIG. 1 it is further indicated how successive supply batches Pi, in particular $P_{11}$, $P_{12}$, $P_{13}$, are distributed over the loading apparatus 1. Dotted lines $L_1$, $L_2$ represent the imaginary separation lines between these batches. "Imaginary" is here understood to mean that in the data flow to the computer, for instance at loading, a feature has been included that is characteristic of such a supply batch $P_{11}$, $P_{12}$, $P_{13}$, for instance an identification code. Each product label comprises this code, so that, accordingly, for each product the origin can be determined, in other words, tracing can take place.

Also depicted in FIG. 1 are the discharge batches $P_O$: $P_{21}$, $P_{22}$ and $P_{23}$. As is indicated in the figure, these batches can be formed simultaneously along different packing belts. Upon allocation of a product to a packing belt, therefore, a signal is sent to the computer in which this information is represented and is added to a label. Additionally, allocation of products generally involves renewed decision at each packing belt. Accordingly, in contrast with the situation at the supply side, separation lines cannot be indicated at conveyor 5, but now the packing belts themselves constitute separation lines. Since the above-mentioned labels further contain all data about supply, input, and identification, it will be possible to determine both the origin and the destination for any cross section of data from the computer, and hence for each product. Moreover, for assembling a discharge batch, one or more packing belts will have to be reserved or assigned. This is also done through the manner of setting the computer.

It will be clear from the foregoing that all data regarding a product are to be found in the label mentioned. More particularly, such a label contains data about the origin, viz. the supply batch Pi, and about the destination, viz. the discharge batch $P_O$. For this stream of data, viz. this stream of labels, to be processed, which is understood to include monitoring, supplementing, removing, storing data in and retrieving data from a memory of a computer, many methods are known in this field of the art. Possibilities for this purpose are provided in terms of hardware, that is, incorporated in the electronics, and there are also procedures for this purpose in terms of software.

For instance, software technology also utilizes so-called shift registers, i.e. an ordered series of fields in which data are grouped. In the present case, these fields correspond to the above-mentioned labels. This stream of data, in particular the movement in time of either the labels or the designation of the labels, in the present case runs synchronously with the movement in time of product positions in the above-discussed sorting apparatus, with the ratio of the length of the register and the length of the route through that sorting apparatus being a well-defined computer program parameter or program setting. These product positions are well-defined positions in the sorting apparatus which are generally related to the pitch distance between the products. When from the beginning of a supply batch, and hence from the end of the preceding supply batch, for each product a batch identification sign or code, in particular an origin code is assigned and so entered in the register, and the same is done for each product with a destination code from the beginning of a discharge batch (and hence also from the end of the preceding discharge batch), all batches, and the products as elements thereof, are traceable, and more particularly the making of any cross section in this stream of data, directed to the identification or retrieval of data of a supply batch or a discharge batch, is practicable.

A computer program, or software, which makes it possible to execute the above-mentioned processing and operations utilizes, for instance, pointing elements or pointers which go through these stored data according to an accurately defined criterion or routine, more particularly run through a shift register of the computer for such a sorting apparatus. Upon passage of a change in origin code or destination code, it is rendered possible in this way to put together all possible combinations and to group the data.

FIG. 2 represents a part of a shift register $R_L$ including labels L which travel parallel to the advancement of the products in the sorting apparatus from left to right along the register path, more particularly are each time shifted on to a next field. Each next or preceding field represents a next or preceding product position in the sorting apparatus, more particularly with an intermediate distance of the above-mentioned pitch distance. The arrows indicate the direction in time, so that after a certain intermediate time q from field $R_k$ at time $t_k$ label $L_n$ has moved on to field $R_{L+q}$ at $T_{k+q}$, and for clarity is now called $L_{n'}$. As has already been indicated above, with the aid of a routine in the computer program, the register $R_L$ can be run through to trace a supply batch or discharge batch in order to subsequently effect the desired cross sections.

Another possibility is, contrary to what is represented in FIG. 2 where the fields are displaced along pointers or pointing elements, for the pointers themselves to move, for instance along a circular shift register, in which a consecutive counting routine provides for sufficient length of the circle through reuse of fields, and corresponding indexing of the labels takes place. Determining cross sections and grouping data is carried out in the same manner.

It will be clear to anyone skilled in the art that small modifications in these techniques where many combinations and small adaptations are possible, are to be understood to be fall within the scope of the claims.

The invention claimed is:

1. A method for automatically sorting and packing batches of products which are each provided with an origin code, comprising:

supplying first batches of origin coded products to a sorting apparatus and simultaneously assigning respective corresponding codes of said first batches of coded products to fields of a register of a computer program, subjecting the products to criteria in at least one classification apparatus, marking the products with classification data as obtained with the classification apparatus, while for each individual product said codes and said data are assembled with the computer program in fields of the register to form a label, and sorting and subsequently packing the classified products to form second, sorted batches of products at packing stations of a packing apparatus, wherein said products at the packing stations are batchwise provided with a second code, a destination code, and these second codes are assigned to the fields of the register and therein are added to the labels of each corresponding product, the computer program comprising a routine for, upon discharge of the second batches from the packing stations, storing labels that contain at least a same destination code and a same origin code of such second batches.

2. The method according to claim 1, wherein the arrangement of fields in the register corresponds to the order of the products in the sorting apparatus.

3. The method according to claim 2, wherein running through and recognizing the classification data and the codes in the fields of the register in the computer program is carried out by pointing elements or pointers whose successive positions during run-through correspond to the positions of the products in the sorting apparatus.

4. The method according to claim 2, wherein the register is a shift register in which the positions of the fields travel along with the positions of the products in the sorting apparatus.

5. The method according to claim 2, wherein the register is a shift register in which the pointers travel along with the positions of the products in the sorting apparatus.

6. The method according to claim 1, wherein the fields with corresponding labels are counted and are stored to form batch cross sections.

7. The method according to claim 1, wherein the label comprises at least the origin code and/or destination code is/are reproduced on a package for the products of corresponding origin.

8. The method according to claim 1, wherein the label, at least the origin code and/or the destination code is/are reproduced on the products of corresponding origin.

9. The method of claim 1 wherein the subjecting the products to criteria in at least one classification apparatus comprises performing at least one measurement relating to a physical characteristic of the product and providing classification data of each product based on that measurement.

10. The method of claim 1 wherein the sorting is based on the classification data obtained during the subjecting of the products to criteria.

11. The method of claim 1 wherein the products are selected from the group consisting of eggs and fruits.

* * * * *